(12) United States Patent
Magal (10) Patent No.: US 10,630,944 B2
(45) Date of Patent: Apr. 21, 2020

(54) METHOD AND SYSTEM FOR DOOR STATUS DETECTION AND ALERT GENERATION

(71) Applicant: Zebra Technologies Corporation, Lincolnshire, IL (US)

(72) Inventor: Harshavardhan Magal, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/030,033

(22) Filed: Jul. 9, 2018

(65) Prior Publication Data

US 2020/0014888 A1   Jan. 9, 2020

(51) Int. Cl.
| | |
|---|---|
| *H04N 7/18* | (2006.01) |
| *G06K 9/62* | (2006.01) |
| *G06K 9/00* | (2006.01) |
| *G08B 21/18* | (2006.01) |

(52) U.S. Cl.
CPC ......... *H04N 7/188* (2013.01); *G06K 9/00718* (2013.01); *G06K 9/00771* (2013.01); *G06K 9/6256* (2013.01); *G08B 21/18* (2013.01); *G06K 2009/00738* (2013.01)

(58) Field of Classification Search
None
See application file for complete search history.

(56) References Cited

U.S. PATENT DOCUMENTS

| | | | | |
|---|---|---|---|---|
| 8,253,792 B2* | 8/2012 | Wells | ..................... | H04N 7/181 348/152 |
| 2016/0012707 A1* | 1/2016 | McKinley | .............. | G08B 25/10 340/679 |
| 2016/0104364 A1* | 4/2016 | Brooks | .................. | B65G 69/00 340/686.1 |
| 2017/0039807 A1* | 2/2017 | Shigeta | .................. | G06Q 50/34 |

OTHER PUBLICATIONS

Maturana et. al. "Voxnet: a 3D convolutional neural network for real-time object recognition" IEEE/RSJ Int Conf Intell Robots Sys pp. 922-928 (Year: 2015).*
Liang et al., "Recurrent Convolutional Neural Network for Object Recognition" The IEEE Conference on Computer and Pattern Recognition (CVPR), pp. 3367-3375 (Year: 2015).*
Krizhevsky et al., "ImageNet Classification with Deep Convolutional Neural Networks" Advances in Neural Information Processing Systems 25 (NIPS 2012) 9 pages (Year: 2012).*

* cited by examiner

*Primary Examiner* — William C Vaughn, Jr.
*Assistant Examiner* — Stuart D Bennett
(74) *Attorney, Agent, or Firm* — Yuri Astvatsaturov (57) ABSTRACT

Disclosed are methods and systems such as an imaging assembly that may include a variety of components, such as, but not limited to, a two-dimensional (2D) camera configured to capture 2D image data, a three-dimensional camera configured to capture three-dimensional (3D) image data, and an evaluation module executing on one or more processors. The 2D camera may be oriented in a direction to capture 2D image data of a first field of view of a container loading area, and the 3D camera may be oriented in a direction to capture 3D image data of a second field of view of the container loading area at least partially overlapping with the first field of view. The evaluation module may be configured to detect a status event in the container loading area based on 2D image data.

13 Claims, 7 Drawing Sheets

METHOD AND SYSTEM FOR DOOR STATUS DETECTION AND ALERT GENERATION

BACKGROUND OF THE INVENTION

In trailer loading analytics, it is important to get accurate data on the status of a vehicle's trailer door to determine whether a trailer door is open or closed. When the trailer is open, a 3D sensor may continually measure fullness of the trailer, and correspondingly a trailer's load efficiency, as more and more load is added to the trailer. Often there is a detection delay of a trailer door's status, whereby unless the vehicle is specifically stopped at a loading area and properly aligned, the actual trailer door status may not be accurately determined. The delay often results in incorrect trailer load efficiency measurements, especially as trailers reach closer to maximum fullness, where the stacked loads may be incorrectly perceived as a vehicle trailer door. Accordingly, there is a need for a method for door status detection and alert generation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Methods and systems for an imaging assembly for use in container loading are disclosed herein. The containers being loaded may be trailers affixed to vehicles, such as vans, trucks, semi-trailer trucks, etc. Alternatively, the containers may also be containers used for transporting loads, such as containers loaded onto ships. In some embodiments, the imaging assembly may include a variety of components, such as, but not limited to, a two-dimensional (2D) camera configured to capture 2D image data, a three-dimensional camera configured to capture three-dimensional (3D) image data, and an evaluation module executing on one or more processors. The 2D camera may be oriented in a direction to capture 2D image data of a first field of view of a container loading area, and the 3D camera may be oriented in a direction to capture 3D image data of a second field of view of the container loading area at least partially overlapping with the first field of view. The evaluation module may be configured to detect a status event in the container loading area based on 2D image data. In order to detect a status event in the container loading area, the evaluation module may be configured to determine if a container door is open, and to determine if a medical emergency exists. To detect status events, the evaluation module is further configured to receive 2D image data from the 2D camera, to evaluate the 2D image data, and to generate an alert for the container loading area based on the evaluation of the 2D image data.

Figure 1:
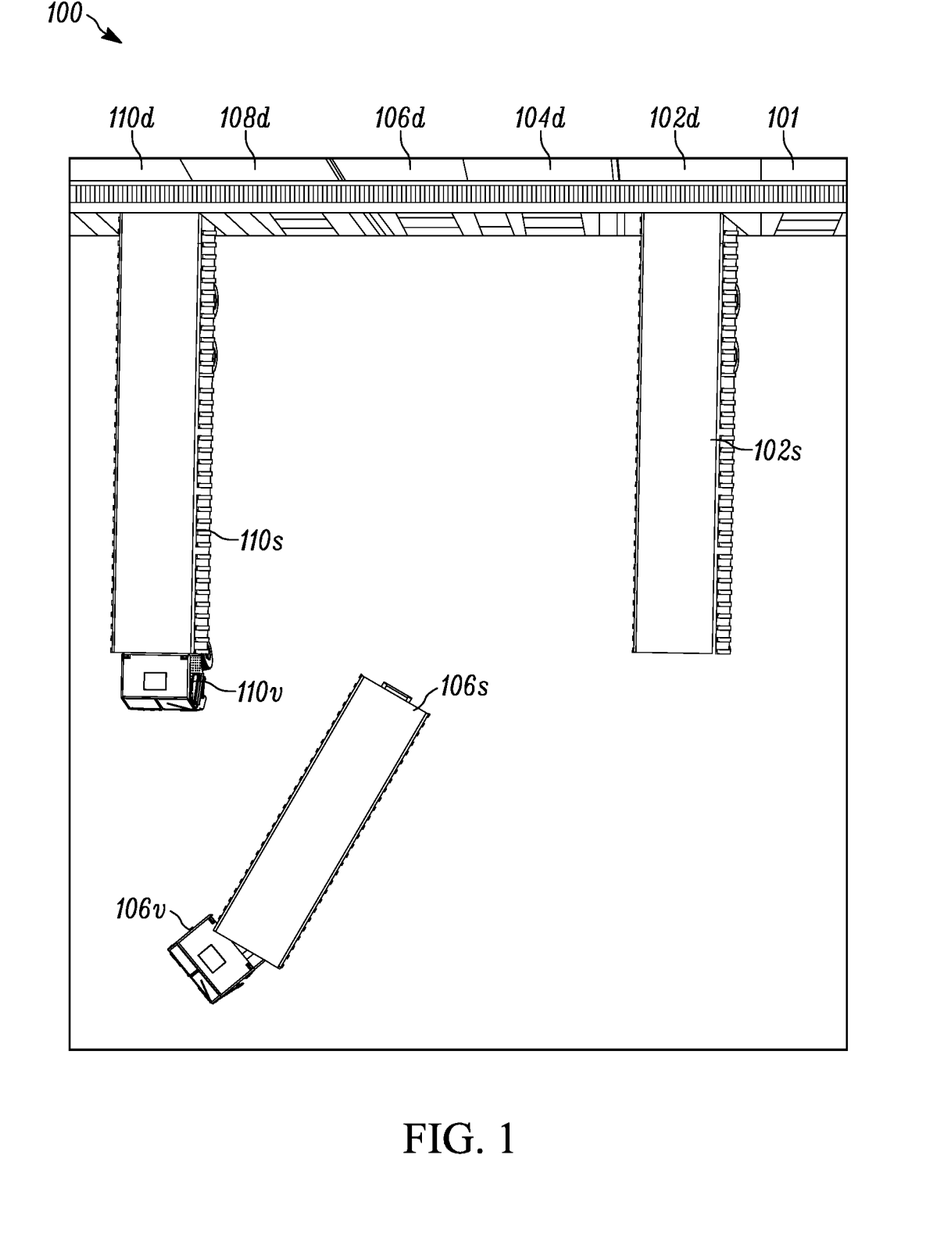
FIG. 1 is a perspective view, as seen from above, of a loading dock including a loading facility, a plurality of docking bays, a plurality of vehicles, and a plurality of vehicle storage areas, in accordance with example embodiments herein.

In particular, the systems and methods described herein may be useful at loading docks for detecting when trailer doors are open or closed. FIG. 1 is a perspective view, as seen from above, of a loading dock 100 including a loading facility 101, a plurality of docking bays 102d-110d, a plurality of vehicles 106v and 110v, and a plurality of vehicle storage areas 102s-110s, in accordance with example embodiments herein. In some embodiments, loading dock 100 may, for example, be associated with a retail store, a wholesale store, or other such commercial building. In other embodiments loading dock 100 may be associated with a storage facility, or waypoint facility, for housing packages, boxes, or other transportable objects or goods typically involved in distribution and logistics of such transportable objects or goods. Additional embodiments are contemplated herein such that loading dock 100 accommodates the loading and unloading of transportable objects or goods at a store, a facility, or other such similar location.

In various embodiments, an opening of a vehicle storage area may be the opening of a trailer, where the trailer may be hauled by a semi, tractor-trailer, truck, or other vehicle capable of hitching and moving a trailer (e.g., vehicle storage area), as described herein. In some embodiments the floor of a trailer, when docked, may be flush, or approximately flush, with the floor of a docking bay (e.g., docking bays 102d-110d) of loading facility 101.

Each of the vehicle storage areas 102s, 106s, and 110s include openings, generally at one end, that are of the same or similar size to the openings of the docking bays 102d-110d. In this way, the vehicle storage areas 102s, 106s, and 110s may interface with, or dock with, the docking bays 102d-110d in order to accommodate the loading and unloading of packages, boxes, or other transportable objects or goods as described herein. Vehicle storage areas, such as 102s, 106s, and 110s, may have different sizes, lengths, or otherwise dimensions. For example, in one embodiment, the vehicle storage area 102s may be associated with a 63 foot long trailer, vehicle storage area may be associated with a 53 foot long trailer, and vehicle storage area 110s may be associated with a 73 foot long trailer. Other variations of vehicle storage area dimensions, sizes, and/or lengths are contemplated herein. Correspondingly, the techniques herein may be used with trailers of different lengths and sizes.

Figure 2:
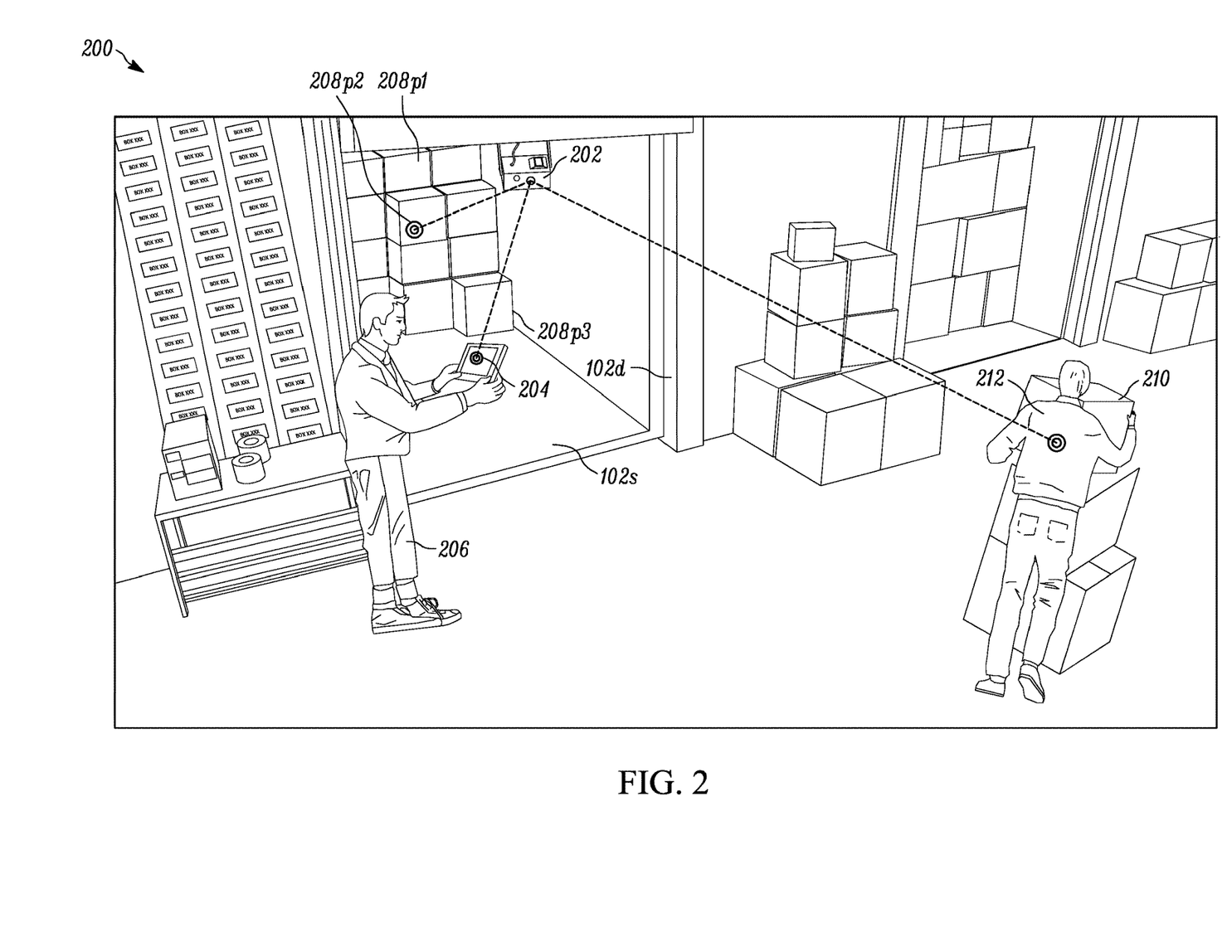
FIG. 2 is a perspective view of the loading facility of FIG. 1 depicting a vehicle storage area docked at a docking bay, in accordance with example embodiments herein.

FIG. 2 is a perspective view 200 of the loading facility 101 depicting vehicle storage area 102s docked at a docking bay 102d, in accordance with example. For example, FIG. 2 an interior view of the vehicle storage area 102s and the docking bay 102d, to which vehicle storage area 102s is docked, exposing the interior of vehicle storage area 102s to the interior of loading facility 101. Vehicle storage area 102s includes packages, boxes, and/or other transportable objects or goods, including packages 208p1-208p3, which may, in some embodiments, correspond to package walls, as described herein. The packages, boxes, and/or other transportable objects or goods may be referred to as the load being stored in trailers and transported by the vehicles. The packages 208p1-208p3 may be in a state of being loaded or unloaded into vehicle storage area 102s. For example, worker 212 may be in a state of loading or unloading additional packages 210 into or out of vehicle storage area 102s. In some embodiments, manager 206 may oversee, assist, or otherwise additionally facilitate the loading or unloading packages, boxes, and/or other transportable objects or goods (e.g., packages 208p1-208p3 or 210) into or out of the vehicle storage area 102s. For example, manager 206 may utilize a dashboard app executing on client device 204 as described herein.

FIG. 2 also depicts a trailer monitoring unit (TMU) 202. TMU 202 may be a mountable device that includes a 3D-depth camera for capturing 3D images (e.g., 3D image data) and a photo-realistic camera (e.g., 2D image data). The photo-realistic camera may be an RGB (red, green, blue) camera for capturing 2D images. The TMU 202 may also include one or more processors and one or more computer memories for storing image data, and/or for executing apps that perform analytics or other functions as described herein. In various embodiments, the TMU 202 may be mounted within loading facility 101 and oriented in the direction of vehicle storage area 102s to capture 3D and/or 2D image data of the interior of vehicle storage area 102s. For example, as shown in FIG. 2, TMU 202 may be oriented such that the 3D and 2D cameras of TMU 202 look down the length of the vehicle storage area 102s so that TMU 202 may scan or sense the walls, floor, ceiling, packages (e.g., 208p1-208p3 or 210), or other objects or surfaces with vehicle storage area 102s to determine the 3D and 2D image data. The image data may be processed by the one or more processors and/or memories of the TMU 202 (or, in some embodiments, one or more remote processors and/or memories of a server) to implement analysis, functions, such as graphical or imaging analytics, as described by the one or more various flowcharts, block diagrams, methods, functions, or various embodiments herein.

In some embodiments, for example, the TMU 202 may process the 3D and 2D image data, as scanned or sensed from the 3D-depth camera and photo-realistic camera, for use by other devices (e.g., client device 204 or server 301, as further described herein). For example, the one or more processors and/or one or more memories of the TMU 202 may process the image data scanned or sensed from vehicle storage area 102s. The processing of the image data may generate post-scanning data that may include metadata, simplified data, normalized data, result data, status data, or alert data as determined from the original scanned or sensed image data. In some embodiments, the image data and/or the post-scanning data may be sent to a client application, such as a dashboard application (app) described herein, for viewing, manipulation, or otherwise interaction. In other embodiments, the image data and/or the post-scanning data may be sent to a server (e.g., server 302 as further described herein) for storage or for further manipulation.

As shown in FIG. 2, the image data and/or the post-scanning data may be received on client device 204. Client device 204 may implement a dashboard app to receive the image data and/or the post-scanning data and display such data, e.g., in graphical or other format, to manager 206 to facilitate the unloading or loading of packages (e.g., 208p1-208p3 or 210), as described herein. In some embodiments, dashboard app may be implemented via a web platform such as Java J2EE (e.g., Java Server Faces) or Ruby on Rails. In such embodiments, the web platform may generate or update a user interface of the dashboard app via generation of a dynamic webpage (e.g., using HTML, CSS, JavaScript) or via a client-facing mobile app (e.g., via Java for a Google Android based app or Objective-C/Swift for an Apple iOS based app), where the user interface is displayed via the dashboard app on the client device, e.g., client device 204.

In some embodiments, the dashboard app may receive the image data and/or the post-scanning data and display such data in real-time. Client device 204 may be a mobile device, such as a tablet, smartphone, laptop, or other such mobile computing device. Client device 204 may implement an operating system or platform for executing the dashboard (or other) apps or functionality, including, for example, any of the Apple iOS platform, the Google Android platform, and/or the Microsoft Windows platform. Client device 204 may include one or more processors and/or one or more memories implementing the dashboard app or for providing other similar functionality. Client device 204 may also include wired or wireless transceivers for receiving image data and/or post-scanning data as described herein. Such wired or wireless transceivers may implement one or more communication protocol standards including, for example, TCP/IP, WiFi (802.11b), Bluetooth, or any other similar communication protocols or standards.

In some embodiments, the image data and/or the post-scanning data may be sent to a server or server, such as server 302 described herein. In such embodiments, the server 302 may generate post-scanning data that may include metadata, simplified data, normalized data, result data, status data, or alert data as determined from the original scanned or sensed image data provided by the TMU 202. As described herein, the server 302 may store such data, and may also send the image data and/or the post-scanning data to a dashboard app, or other app, implemented on client device, such as the dashboard app implemented on client device 204 of FIG. 2.

Figure 3:
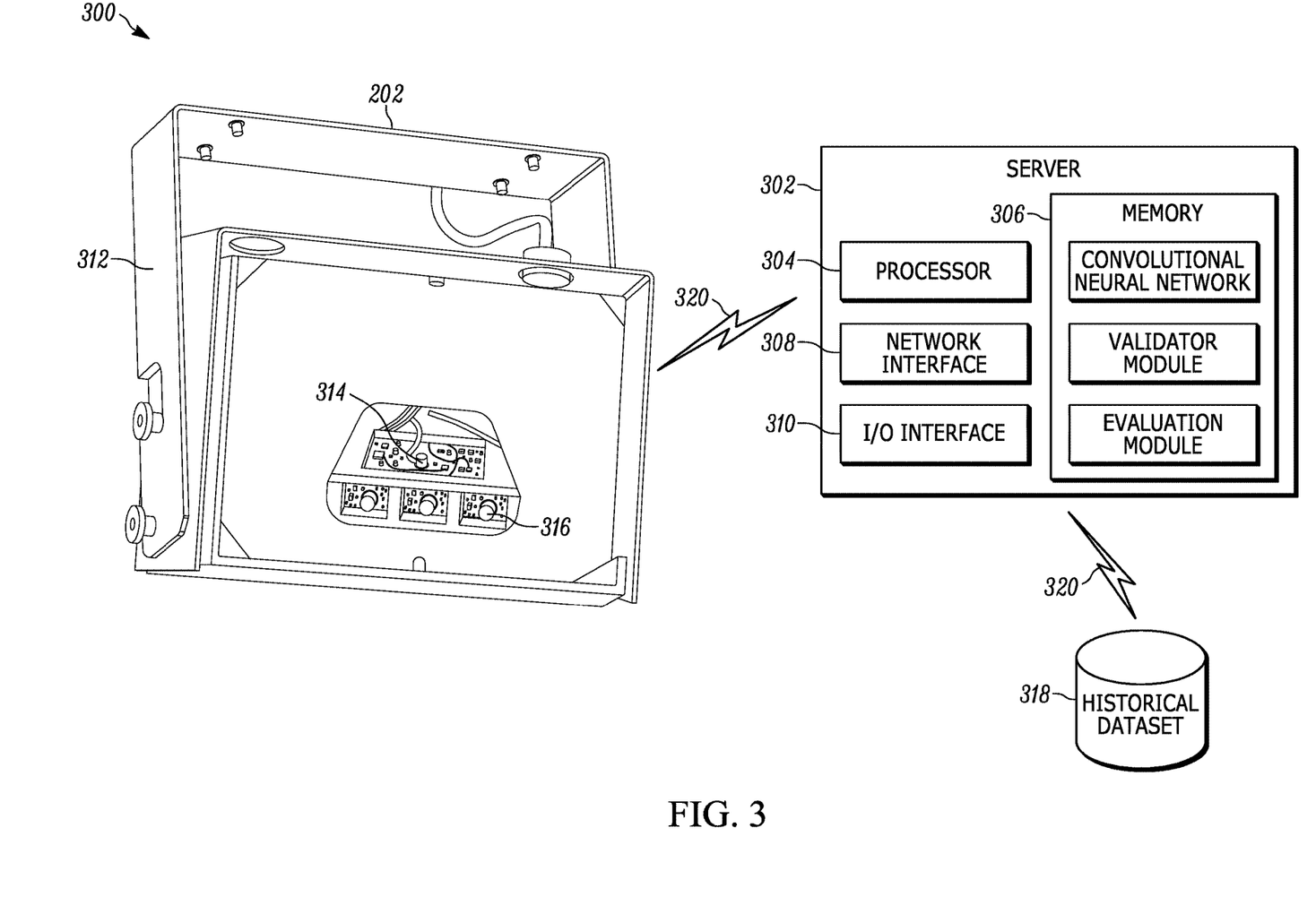
FIG. 3 illustrates an embodiment of an imaging assembly for use in detecting a door status during container loading.

FIG. 3 illustrates an embodiment of an imaging assembly for use in detecting a door status during container loading. In particular, the system 300 may be operable to detect a status event in a container loading area. The system 300 may include a TMU 202, and a server 302 associated with the loading facility 101 of FIG. 2. The server 302 may be communicatively coupled to the TMU 202 through a network connection 320. In some embodiments, server 302 may be located in the same facility as loading facility 101. In other embodiments, server 302 may be located at a remote location, such as on a cloud-platform or other remote location. For particular applications, such as for example training a convolutional neural network for use in detecting status events in a container loading area, locating the server 302 at a remote location may be useful for storing potentially large datasets that are used to "train" the neural network.

The server 302 may include a processor 304, memory 306, network interface 308, and I/O interfaces 310. Stored within the memory 306 may be a set of computer applications, or modules, that are configured to perform certain functions. In particular, the set of applications/modules may be a convolutional neural network, a validator module, and an evaluation module.

A convolutional neural network may be a type of neural network that uses convolution as a basic operation. In the context of an image processing system a convolution operation may utilize a convolutional kernel (e.g. a small 2D array of a fixed size). The convolutional kernel may be slid across an image horizontally and vertically, and after each step in either direction the input pixels of the image overlapped by the convolutional kernel are multiplied by the corresponding convolutional kernel values and added together to produce an output value that will form a new pixel in the output image.

For example, a particular pixel has a value of (11, 5, 16), and a convolutional kernel has values of (2, 2, 2). Additionally, there may also be padded values added to each "side" of the particular pixel, so that there is a 0 on each side resulting in (0, 11, 5, 16, 0) values for the pixel. Then during the convolution operation the convolutional kernel moves from left to right along the pixel, resulting in a new pixel with values of (32, 62, 42). These values are calculated according to the table below:

| convolution step (each step is a result of sliding the convolutional kernel) | padded input values | | | | | |
| --- | --- | --- | --- | --- | --- | --- |
|  | 0 | 11 | 5 | 16 | 0 | |
| 1 | 2 | 2 | 2 | | | 32 (22 + 10) |
| 2 | | 2 | 2 | 2 | | 64 (22 + 10 + 32) |
| 3 | | | 2 | 2 | 2 | 42 (10 + 32) |

To repeat, the convolution kernel is slid across the padded input values three times to produce an output of equal size as input (32, 64, 42).

In this way, a new convolution image is created that is a result of that convolution performed across the image in all directions. A typical convolutional neural network consists of many convolutional layers (a sequence of convolution operations performed on the output of the previous operation). That is to say, the convolutional kernel is run across the original image, and each subsequent image generated as a result of the sequence of convolution operations.

While designing the convolutional neural network the designer may decide on the number of layers that the neural network will consist of, the size of the convolutional kernels, as well as the number of kernels used in each layer. These design decisions collectively define the overall architecture of the network, which determines how different types of images are handled and to what degree those images need to be manipulated. The architecture of the network may be changed as needed to handle different types of images. Additionally, when a network is created and initialized all values (also known as weights) in all layers are initialized to random values.

Here, the convolutional neural network may be designed to label images that are fed into it. The labels that are applied may indicate whether a trailer door is open or closed, whether medical emergency exists in a trailer or the surrounding area, and whether a safety guideline violation exists in or around the trailer. The label may be a place encoded one dimensional array that can have any number of elements, such as for example, an array of 4 elements where each element represents the aforementioned labels: door close, door open, medical emergency, safety guideline violation. The labels may take the form of a probability, or confidence score, that the input image contains whatever the label represents. Consequently, the final output of the neural network may be a one-dimensional array with four elements where each element is the probability of the image containing one of the labels mentioned above.

For example, an output of [0.9, 0.1, 0.2, 0.15] represents the confidence scores (represented as probabilities) of the convolutional neural network that it has assigned to each of the categories where the input image falls into. Here the neural network is 90% confident that the door is closed and since the closed and open state are mutually exclusive the network assigns the remaining probability to the open category. Conversely, the medical emergency and safety guideline violation labels are independent and their probabilities are independent of other labels. In the example above the medical emergency confidence score is 20% and safety guideline violation category has a 15% confidence score. The systems and methods disclosed herein may set a threshold for all confidence scores and any score for a label exceeding the threshold is output to the server for alert generation. This threshold may be set manually by a user of the system, or may dynamically change as the neural network is trained. Since the output of this neural network may indicate a confidence score in more than one label it may be called a multi-label classification system.

In some embodiments, the convolutional neural network may be trained to detect a status event in a container door. For example, the convolutional neural network may access a historical dataset 318 that is communicatively coupled with the server 302 via a network connection 320. The convolutional neural network may use the historical data set 318 to train the convolutional neural network by inputting previously tagged and identified image data into the convolutional neural network. Put more specifically, the process of training is to input images to the convolutional neural network until the network arrives at a right set of weights in each layer to achieve the intended output. For every input image that goes through the convolutional neural network if the final output array does not match an anticipated array then a careful adjustment of weights is performed based on the margin of error. This process is called "back propagation" of error. Back propagation requires a known desired output value, which may be a range of values, for each input value. An algorithm called the gradient descent, which finds local minima values for a function, is employed to perform this fine tuning of weights.

In order to start the training process, the input data and the labels need to be prepared to facilitate training. This may be done by creating a file that contains the input file names and the associated labels that are manually entered. For example, if there is an image file "example_input.png" and it has been determined through manual inspection of the image that the image consists of a "door_open" and "medical emergency situation" then a line may be added into a file as shown below. Specifically, a line may be added in the file for every input image that is used for training the neural network: [Image, door_open, door_close, medical_emergency, safety violation], or example_input.png, 1,0,1,0.

The convolutional neural network may be coupled to the validator module. In some embodiments, the validator module may be configured to determine whether a label applied to image data by the convolutional neural network is valid or not. In particular, the validator module may indicate whether a container door is closed or open. The validator module may also indicate whether other labels, such as those for safety, compliance, or other alert situations, applied to the image data are valid.

In some embodiments, the evaluation module may be configured to detect and evaluate a door status event. The evaluation module may detect and evaluate door status events by coordinating the activities of the convolutional neural network, and the validator module. The evaluation module may also be configured to send status events to other components in the system 300, for example, reporting a door close, door open, or alert event to the server 302 that may be processed by a user of the client device 204.

The modules may be configured to utilize the other components of the server 302 to execute their functionality. For example, computer instructions may be stored in memory 306 (e.g. in one of the modules) that are executed at the processor 304 and take as input data that originated at the TMU 202, that was received through the network interface 308, or through I/O interface 310. In some embodiments, the modules may be able to leverage processing power that is at a location separate from the server 302.

Server 302 is configured to execute computer instructions to perform operations associated with the systems and methods as described herein, for example, implement the example operations represented by the block diagrams or flowcharts of the drawings accompanying this description. The server 302 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM Web Sphere platform, etc. Other technologies or platforms, such as Ruby on Rails, Microsoft .NET, or similar may also be used. In addition, TMU 202 may further include a network interface to enable communication with other devices (such as server 302 of FIG. 3 as described herein). The network interface of TMU 202 may include any suitable type of communication interface(s) (e.g., wired and/or wireless interfaces) configured to operate in accordance with any suitable protocol(s), e.g., Ethernet for wired communications and/or IEEE 802.11 for wireless communications. As described below, the server 302 may be specifically configured for performing operations represented by the block diagrams or flowcharts of the drawings described herein.

The example server 302 includes a processor 304, such as, for example, one or more microprocessors, controllers, and/or any suitable type of processor. The example server 302 of FIG. 3 further includes memory (e.g., volatile memory or non-volatile memory) 306 accessible by the processor 304, for example, via a memory controller (not shown). The example processor 304 interacts with the memory 306 to obtain, for example, machine-readable instructions stored in the memory 306 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 302 to provide access to the machine-readable instructions stored thereon.

The example server 302 may further include a network interface 308 to enable communication with other machines via, for example, one or more computer networks, such as a local area network (LAN) or a wide area network (WAN), e.g., the Internet. The example network interface 306 may include any suitable type of communication interface(s) (e.g., wired and/or wireless interfaces) configured to operate in accordance with any suitable protocol(s), e.g., Ethernet for wired communications and/or IEEE 802.11 for wireless communications.

The example server 304 of FIG. 3 includes input/output (I/O) interfaces 310 to enable receipt of user input and communication of output data to the user, which may include, for example, any number of keyboards, mice, USB drives, optical drives, screens, touchscreens, etc.

As shown in FIG. 3, the TMU 202 may include a mounting bracket 312 for orienting or otherwise positioning the TMU 202 within loading facility 101 as described herein. The TMU 202 may further include one or more processors and one or more memories for processing image data as described herein. For example, the TMU 202 may include flash memory used for determining, storing, or otherwise processing the imaging data and/or post-scanning data.

In some embodiments, the 3D-depth camera 314 may include an Infra-Red (IR) projector and a related IR camera. In such embodiments, the IR projector projects a pattern of IR light or beams onto an object or surface, which, in various embodiments herein, may include surfaces of a vehicle storage area (e.g., vehicle storage area 102s) or objects within the vehicle storage area, such as boxes or packages (e.g., packages 208p1-208p3 or 210). The IR light or beams may be distributed on the object or surface in a pattern of dots or points by the IR projector, which may be sensed or scanned by the IR camera. A depth-detection app, such as a depth-detection app executing on the one or more processors or memories of TMU 202, can determine, based on the pattern of dots or points, various depth values, for example, depth values of vehicle storage area 102s. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or TMU 202 to generate a depth map. The depth map may represent a 3D image of, or contain 3D image data of, the objects or surfaces that were sensed or scanned by the 3D-depth camera 314, for example, the vehicle storage area 102s and any objects or surfaces therein.

The photo-realistic camera 316 may be an RGB (red, green, blue) based camera for capturing 2D images having RGB-based pixel data. In some embodiments, the photo-realistic camera 316 may capture 2D images, and related 2D image data, at the same or similar point in time as the 3D-depth camera 314 such that the TMU 202 can have both sets of 3D image data and 2D image data available for a particular surface, object, or scene at the same or similar instance in time.

Figure 4:
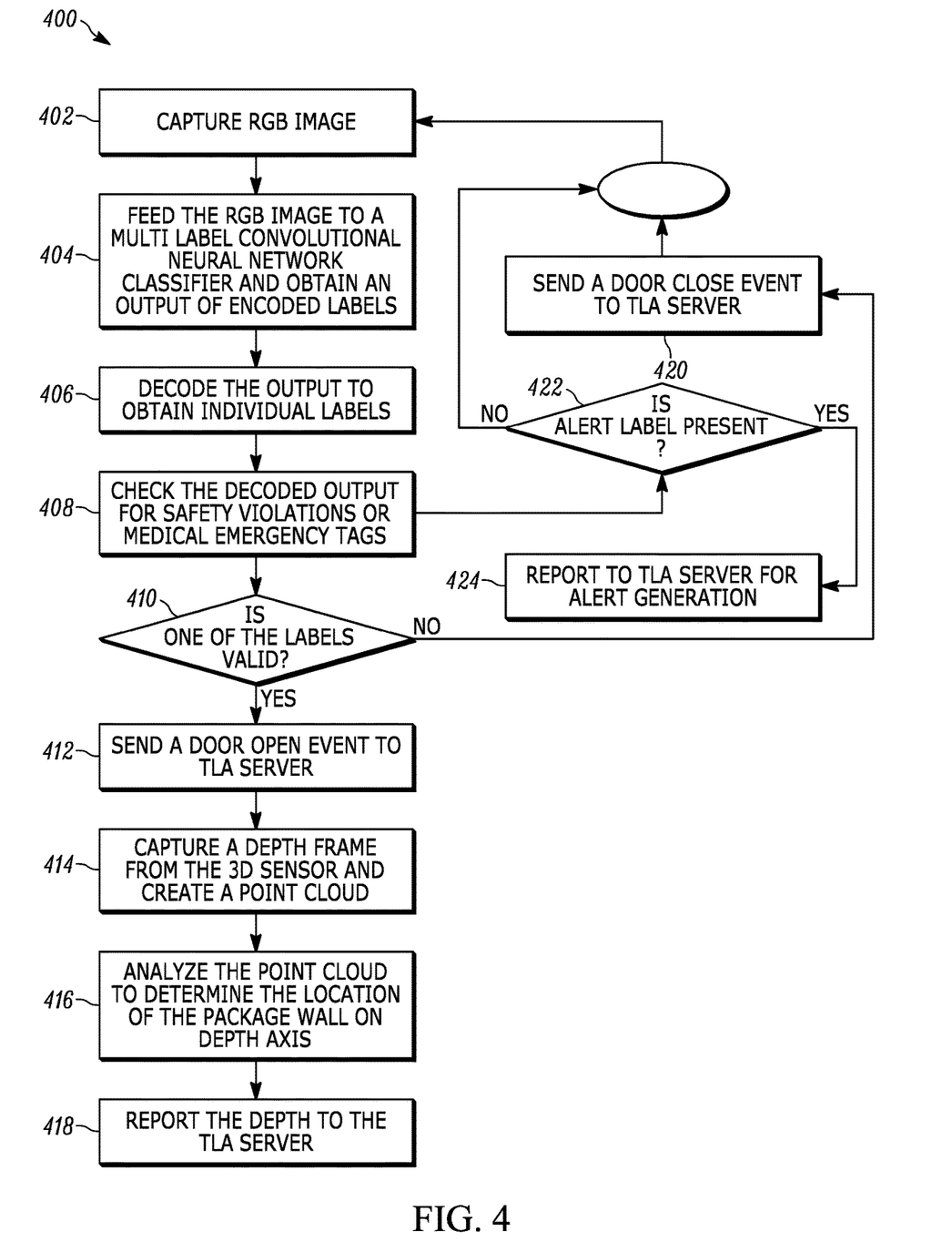
FIG. 4 is an example flowchart representative of embodiments of door status detection depicted herein.

FIG. 4 is an example flowchart representative of embodiments of door status detection depicted herein. This disclosure describes solutions to effectively and reliably detect when a trailer door opens and closes in real time. As such the TMU 202 may benefit from knowing when the trailer door is open or closed and produce more valid measurements. When the measurements are valid, valid utilization and fullness calculations for a trailer load are possible. Additionally, valid measurements prevent fluctuations in a graph measuring trailer fullness towards the end of a trailer load. Additionally, the systems and methods may generate alerts for special circumstances or emergency situations, such as medical situations. Generally, speaking use of existing RGB camera's continuous image frames are sent as inputs to a trained convolutional neural network image classifier to detect real-time status of a trailer door to determine whether the door is in an open or closed status.

The method 400 may be executed by any of the systems disclosed herein. To detect the door status, the method employs a multi-label classifier using a convolutional neural network, such as the convolutional neural network shown in FIG. 3. The convolutional neural network may be trained on images that are pre-classified and labeled. That is, the neural network may be fed a set of images that are already tagged as valid, or having a safety violation, or the like, to allow the neural network to learn by making comparisons between images to find commonalities and differences. In this way, the convolutional neural network ends up being adept at identifying particular situations of interest in trailer loading. Similarly, the neural network may divide an image into segments, and subsequently analyze images in segments. Further analysis of the images may be conducted by the neural network based on that segmented analysis. This results in a series of stages at which the neural network is refining its understanding of the desired outcome, and how the desired outcome may appear in images.

At block 402, the method takes in as input an image from a RGB camera. At block 404, the RGB image is fed to the multi-label convolutional neural network classifier, such as the convolutional neural network depicted in FIG. 3. The convolutional neural network analyzes the RGB image, and obtains an output of encoded labels based on the analysis of the RGB image. The neural network is trained to appropriately classify the images collected over a period of time and output an encoded vector that indicates the different labels that are attributed to the image.

At block 406, this output is decoded to produce one of two labels, and optionally an alert label. In some embodiments, the output may be decoded by the validator module of FIG. 3. One label may be a "valid" label that is a mandatory label indicating that a container door is open and that depth measurements taken by a TMU are valid. The other label may be an "invalid" label that is a mandatory label indicating that a container door is closed and that depth measurements taken by a TMU would be invalid.

At block 408, the method may check the decoded output for alert labels. For example, a violation label which is an alert label indicating there has been a safety guideline violation. Or an emergency label which is an alert label indicating there is a medical emergency. At block 422, when an alert label is present, a report is sent to the TLA server for alert generation at block 424.

At block 410, label validity is checked. This may be done by the validator module of FIG. 3. In particular, if a classified label is valid at block 410, then at block 412 a door open event is sent to the TLA server. Conversely, if the label is not valid a door close event is sent to the TLA server at block 420. If valid the method proceeds to capture a depth frame from the 3D sensor at block 410 and creating a point cloud. At block 416 the method includes analyzing the point cloud for the package wall location on the depth axis. Accordingly, the depth is reported to the TLA server at 418. In this way, depth measurements may only be taken when a container door is open and thus any measurements of the depth in a trailer will be more accurate than current methods provide.

Figure 5:
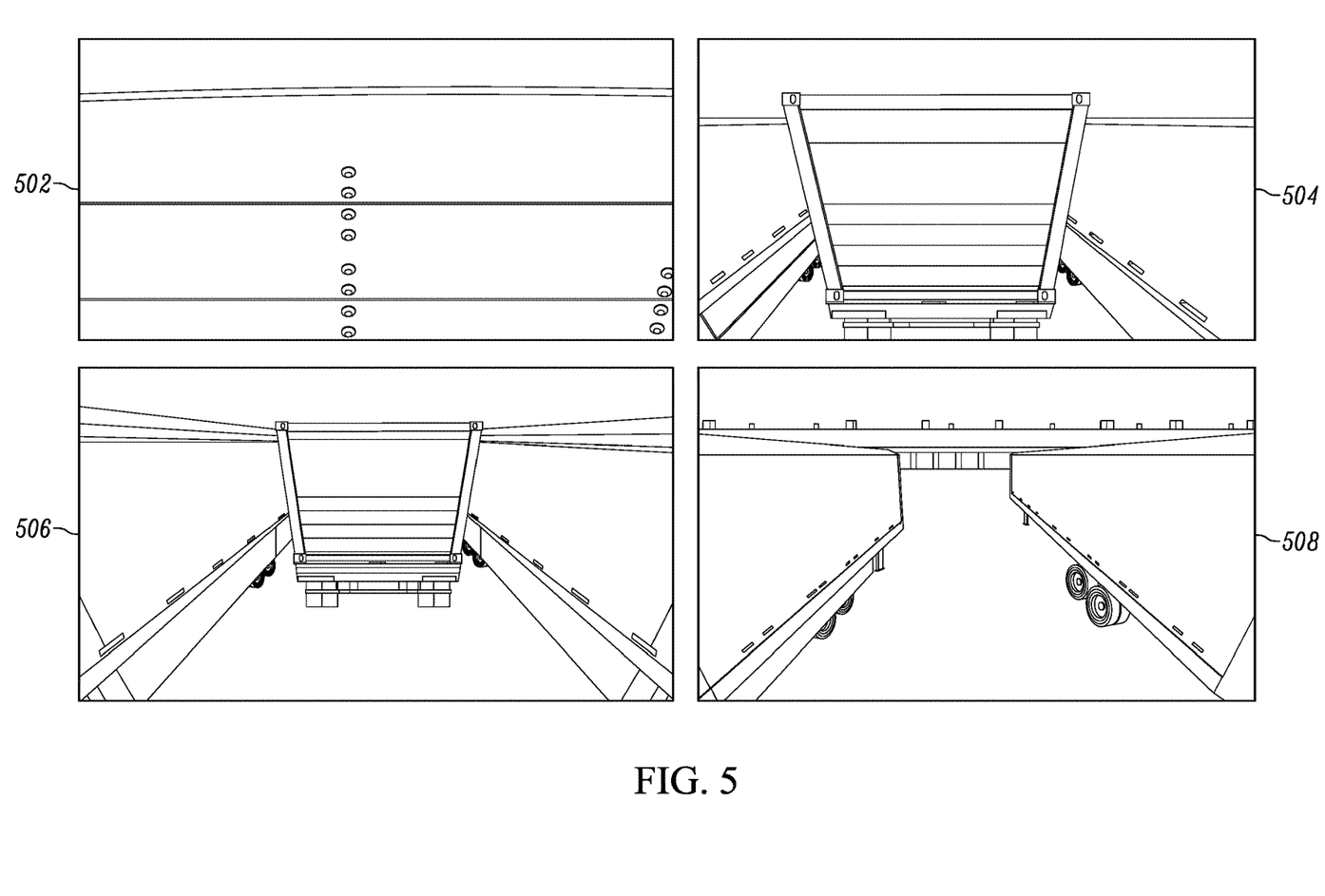
FIG. 5 illustrates example screenshots of trailer door status in a variety of configurations detectable by the embodiments disclosed herein.

FIG. 5 provides example screenshots of trailer door status in a variety of configurations detectable by the embodiments disclosed herein. For example, the systems and methods shown in FIGS. 3, 4, and 7 may be utilized to detect the trailer door statuses shown in FIG. 5. The screenshots are example images labeled as invalid for depth measurements and hence utilization calculations. Image 502 shows a trailer that has pulled up too close in the trailer loading area.

Image 504 shows a trailer that is too far from the loading area to allow the trailer to be unloaded. Similarly, image 506 shows the trailer is too far away to be loaded or unloaded. Conversely, in image 508 there is no trailer in the trailer loading area. All four of these scenarios depicted in images 502-508 are representative of times where attempting to take measurements of a trailer, or determine the fullness of a trailer would not work, because the trailer is either in an odd position, or not in the trailer loading area all together.

Figure 6:
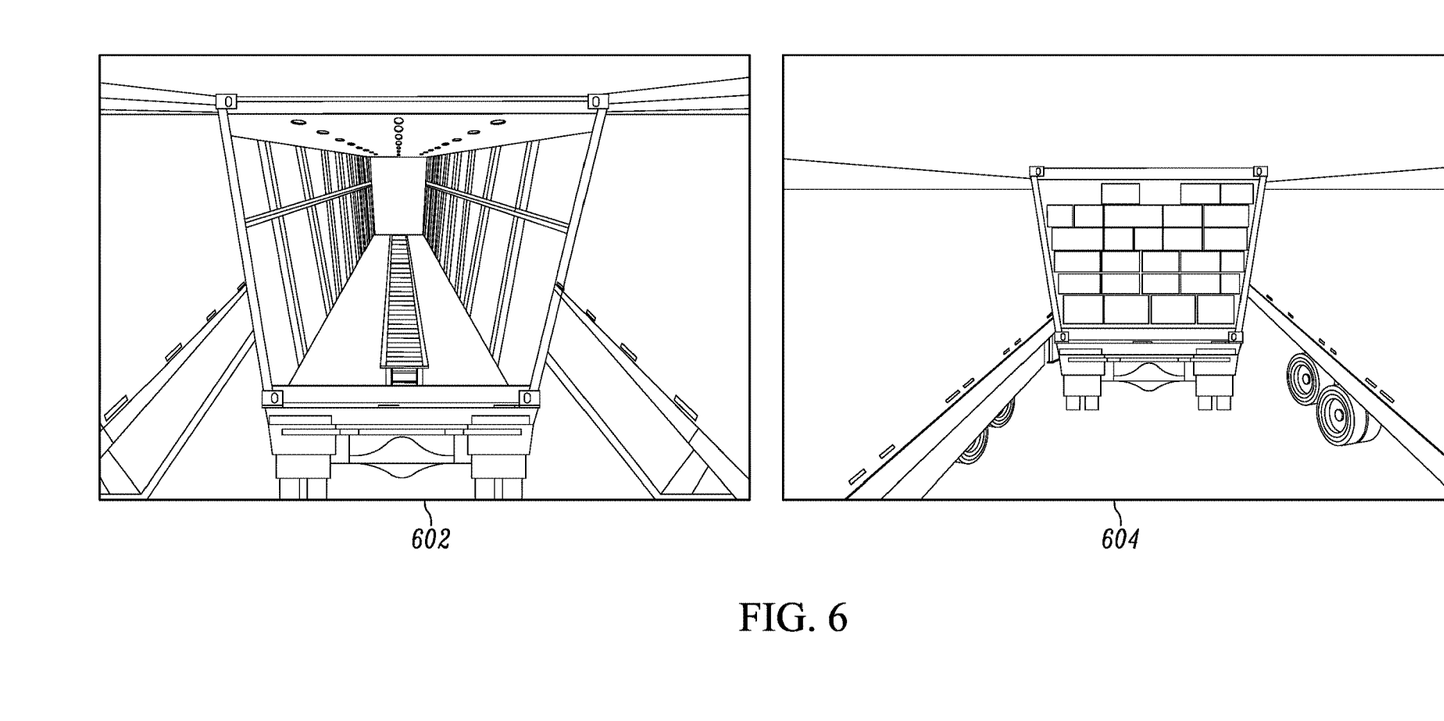
FIG. 6 illustrates example screenshots of trailer door status in a variety of configurations detectable by the embodiments disclosed herein.

FIG. 6 provides example screenshots of trailer door status in a variety of configurations detectable by the embodiments disclosed herein. For example, the systems and methods shown in FIGS. 3, 4, and 7 may be utilized to detect the trailer door statuses shown in FIG. 6. For example, in addition to detecting a trailer door status, the neural network, such as the convolutional neural network shown in FIG. 3, can also be trained to output additional labels to detect violations of safety guidelines. The convolutional neural network may be trained using pre-classified data as described herein. Such situations may include, for example, a trailer pulling away of a trailer with the trailer door left open after the load is complete as shown in images 602 and 604. The systems and methods may automatically generate alerts to the operations manager in these cases.

Similarly, as mentioned above the neural network can also be trained to detect medical emergencies or other accidents such as, for example, when a worker loading inside a trailer slips and falls down, and generate real time alerts aiding in sending immediate help to the worker. It can aid in automatically grouping the images during the hazard and help in further analysis of the incident.

Figure 7:
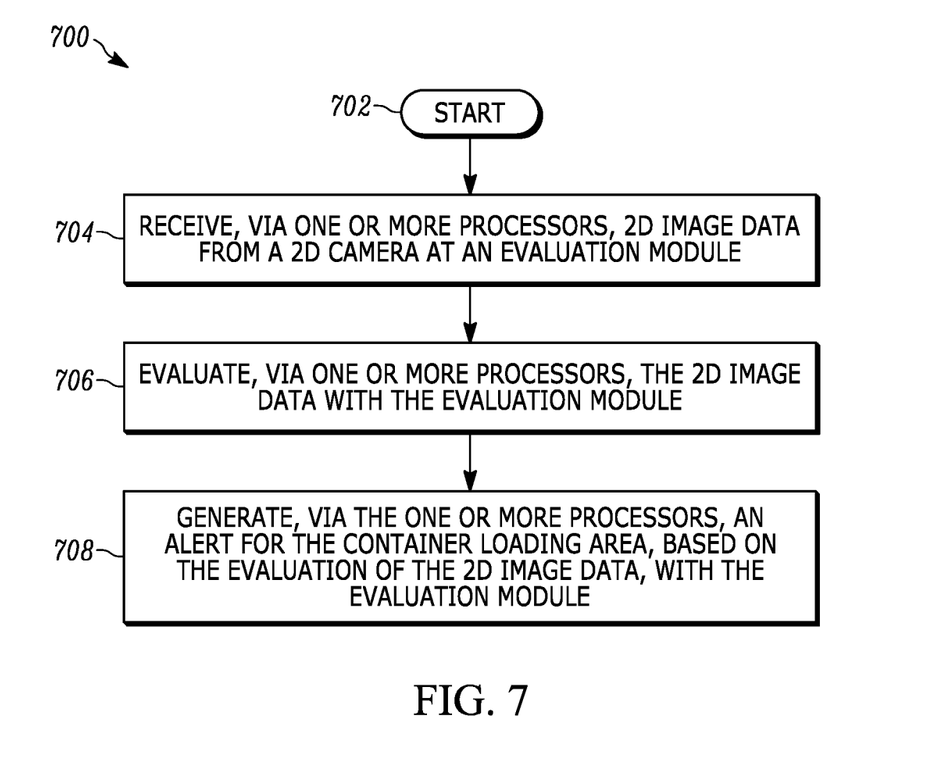
FIG. 7 is a flow chart of a method for detecting trailer door status.

FIG. 7 is an example flow chart of a method for detecting trailer door status. The method may be executed by any of the computing systems described herein, such as the systems and methods described in FIGS. 3 and 4. For example, the method may be executed in conjunction with the TMU 202 described above. Alternatively, in some embodiments the method may executed by a server, or the server 302 in conjunction with the TMU 202. The method may include additional or fewer steps than what are described herein.

FIG. 7 is a flow chart of a method 700 for detecting the status of a door. In particular, whether a door on a container, such as a trailer, is open or not. Method 700 starts at block 702, where a 2D camera, (e.g. the 2D camera 316 of TMU 202) captures 2D image data. The 2D camera is oriented in a way to capture 2D image data of a trailer loading area as described herein, and as shown in FIGS. 5 and 6. In some embodiments, the 2D image data is high quality RGB image data (e.g. an RGB image having a resolution of 1900×1080). These 2D cameras may be running all day at a predetermined frame rate (e.g. at a frame rate of 1 frame per second, 10 frames per second, etc., or a slower rate of 1 frame per minute, 1 frame per five minutes, etc.) to ensure accurate measurements are made by not missing any activity in a trailer loading area.

At block 704, the 2D image data that is captured by the 2D image camera is received by an evaluation module executing on one or more processors. The evaluation module may be the evaluation module shown in memory 306, or in some cases the evaluation module may be stored in memory at the TMU 202. The evaluation module may be executed across one or more processes in the same computing system or distributed across computing systems. In some embodiments, the one or more processers may be processors(s) of the TMU 202, as described herein. In certain embodiments the 2D camera and the one or more processors may be housed in a mountable device, such as TMU 202 depicted in FIGS. 2 and 3. In other embodiments, the one or more processors may be processors(s) (e.g., processor 306) of the server 304 as described herein. Based on the 2D image data, the evaluation module determines a door status. In some embodiments, the captured 2D image data is a 2D video feed of the container loading area. Similarly, the captured 2D image data may be a set of 2D images.

At block 706, the evaluation module evaluates the 2D image data. In some embodiments, to evaluate the 2D image data, the 2D image data is fed into a convolution neural network trained to detect status events, such as the convolutional neural network shown in FIG. 3. The convolutional neural network may be trained on a historical dataset of prior container 2D image data, such as the historical dataset 318 shown in FIG. 3. In some embodiments, the evaluation module may send the output from feeding the image date into the convolutional neural network into a validator module, such as the validator module shown in FIG. 3 to determine whether a door status is valid or not.

The convolutional neural network may be programmed such that it is continuously learning while it is executing and being "fed" 2D images. For example, while the evaluation module, and imaging assembly as described herein, are executing, the neural network can be updating itself in real-time with newly received 2D image data to refine the accuracy of the neural network. To refine the accuracy of the neural network, the newly received 2D image data may be compared against previously received 2D image data, as well as against historical 2D image data stored in a historical dataset.

At block 708, the evaluation module may generate an alert for the container loading area based on the evaluation of the 2D image data. The alert may correspond to a status event corresponding to the loading area, any trailers in the loading area, etc. In some embodiments, the status event indicates the container door is open or close. Similarly, in some embodiments the status event is a safety situation indicating an employee in need of medical attention.

In further embodiments of the method 700 the evaluation module may be configured to, in response to a detected status event, store in a memory, 2D image data captured prior to the status event, and 2D image data captured after the status event. For example, when an invalid door status is detected or a safety violation is detected by evaluation of the 2D image data, the evaluation module may store relevant 2D image data. The relevant 2D image data may be image data that is collected during a time span before and after the detection of the door status where the range of the time span may be predetermined. To collect this window of image data, the TMU may be configured to buffer a pre-determined amount of captured 2D image data during image capture processes. This buffer may be continuously updated during valid door status operations (including cleaning and re-populating). However, when an invalid door status is determined, the buffered 2D image data may be used for training the convolutional neural network, and may also be used for investigative purposes if investigating an accident, or other safety violation in a trailer or trailer loading area.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An imaging assembly for use in container loading, the imaging assembly comprising:
a housing;
a two-dimensional (2D) camera housed within the housing and configured to capture 2D image data, the 2D camera oriented in a direction to capture the 2D image data from a first field of view of a container loading area;
a three-dimensional (3D) camera housed within the housing and configured to capture 3D image data, the 3D camera oriented in a direction to capture the 3D image data from a second field of view of the container loading area at least partially overlapping with the first field of view; and
an evaluation module executing on one or more processors, the evaluation module being configured to detect a status event in the container loading area based on the 2D image data to determine if a container door is open,
wherein, responsive to the evaluation module determining that the container door is open, the evaluation module is further configured to transmit a door-open status to a server, and
wherein, responsive to the server receiving the door-open status and responsively generating a 3D-image-capture signal and transmitting the 3D-image-capture signal to the 3D camera, the imaging assembly is configured to cause the 3D camera to capture the 3D image data and transmit the 3D image data to the one or more processors.

2. The imaging assembly of claim 1, wherein the server is remote from the imaging assembly.

3. The imaging assembly of claim 1, wherein the evaluation module is further configured to detect an alert event in the container loading area based on the 2D image data to determine if at least one of a safety guideline violation and a medical emergency in the container loading area and, responsive to detecting the alert event, generating and transmitting the alert event to the server.

4. The imaging assembly of claim 1, wherein the one or more processors is configured to process the 3D image data received from the 3D camera to determine a location of a package wall within the container loading area.

5. A system for use in container loading, comprising:
a server; and
an imaging assembly communicatively coupled to the server, the imaging assembly including:
a housing;
a two-dimensional (2D) camera housed within the housing and configured to capture 2D image data, the 2D camera oriented in a direction to capture the 2D image data from a first field of view of a container loading area;
a three-dimensional (3D) camera housed within the housing and configured to capture 3D image data, the 3D camera oriented in a direction to capture the 3D image data from a second field of view of the container loading area at least partially overlapping with the first field of view; and
an evaluation module executing on one or more processors, the evaluation module being configured to detect a status event in the container loading area based on the 2D image data to determine if a container door is open,
wherein, responsive to the evaluation module determining that the container door is open, the evaluation module is further configured to transmit a door-open status to the server, and
wherein, responsive to the server receiving the door-open status and responsively generating a 3D-image-capture request and transmitting the 3D-image-capture request to the imaging assembly, the imaging assembly is configured to cause the 3D camera to capture the 3D image data and transmit the 3D image data to the server.

6. The system of claim 5, wherein the server is remote from the imaging assembly.

7. The system of claim 5, wherein the evaluation module is further configured to detect an alert event in the container loading area based on the 2D image data to determine if at least one of a safety guideline violation and a medical emergency in the container loading area and, responsive to detecting the alert event, generating and transmitting the alert event to the server.

8. The system of claim 5, wherein the one or more processors is configured to process the 3D image data received from the 3D camera to determine a location of a package wall within the container loading area.

9. The system of claim 5, wherein the direction of orientation of the 2D camera is such that the first field of view extends in a first generally horizontal direction allowing the 2D camera to capture 2D images of a distal upright wall of a trailer docked within the container loading area, and
wherein the direction of orientation of the 3D camera is such that the second field of view extends in a second generally horizontal direction allowing the 3D camera to capture 3D images of an interior of the trailer docked within the container loading area.

10. A system for use in container loading, comprising:
a server; and
an imaging assembly communicatively coupled to the server, the imaging assembly including:

a housing;

a two-dimensional (2D) camera housed within the housing and configured to capture 2D image data, the 2D camera oriented in a direction to capture the 2D image data from a first field of view extending in a first generally horizontal direction allowing the 2D camera to capture 2D images of a distal upright wall of a trailer docked within a container loading area;

a three-dimensional (3D) camera housed within the housing and configured to capture 3D image data, the 3D camera oriented in a direction to capture the 3D image data from a second field of view extending in a second generally horizontal direction allowing the 3D camera to capture 3D images of an interior of the trailer docked within the container loading area, the second field of view at least partially overlapping with the first field of view; and an evaluation module executing on one or more processors, the evaluation module being configured to detect a status event in the container loading area based on the 2D image data to determine if a container door is open, wherein, responsive to the evaluation module determining that the container door is open, the evaluation module is further configured to transmit a door-open status to the server, and wherein, responsive to the server receiving the door-open status and responsively generating a 3D-image-capture request and transmitting the 3D-image-capture request to the imaging assembly, the imaging assembly is configured to cause the 3D camera to capture the 3D image data and transmit the 3D image data to the server.

11. The system of claim 10, wherein the server is remote from the imaging assembly.

12. The system of claim 10, wherein the evaluation module is further configured to detect an alert event in the container loading area based on the 2D image data to determine if at least one of a safety guideline violation and a medical emergency in the container loading area and, responsive to detecting the alert event, generating and transmitting the alert event to the server.

13. The system of claim 10, wherein the one or more processors is configured to process the 3D image data received from the 3D camera to determine a location of a package wall within the interior of the trailer docked within the container loading area.

* * * * *